United States Patent
Kartschmaroff et al.

[15] 3,696,135

[45] Oct. 3, 1972

[54] PROCESS FOR THE PRODUCTION OF NICKEL SALTS OF MONOESTERS OF 3,5-DI-TERT. BUTYL-4-HYDROXYBENZYLPHOSPHONIC ACID

[72] Inventors: Peter Kartschmaroff, Arlesheim/Basel-Land; Paul Moser, Basel, both of Switzerland

[73] Assignee: Ciba-Geigy Corporation, Ardsley, N.Y.

[22] Filed: July 16, 1970

[21] Appl. No.: 55,616

[30] Foreign Application Priority Data

July 31, 1964  Switzerland............11649/69

[52] U.S. Cl............................260/439 R, 260/457 SN
[51] Int. Cl..............................................C07f 15/02
[58] Field of Search......................................260/439

[56] References Cited

UNITED STATES PATENTS

| | | | |
|---|---|---|---|
| 3,310,575 | 3/1967 | Spivack | 260/429 R |
| 3,395,112 | 7/1968 | Kauder | 260/439 R X |
| 3,488,368 | 1/1970 | Spivack | 260/439 R X |

OTHER PUBLICATIONS

Rabinowitz J. Am. Chem. Soc. 82(1960) p. 4564–7

*Primary Examiner*—Tobias E. Levow
*Assistant Examiner*—A. P. Demers
*Attorney*—Karl F. Jorda and Martin J. Spellman

[57] ABSTRACT

Nickel salts of monoesters of 3,5-di-tert.butyl-4-hydroxybenzylphosphonic acid are produced by saponifying the corresponding diesters and adding a nickel salt to the reaction mixture. The obtained nickel salts are stabilizers of synthetic polymers.

6 Claims, No Drawings

PROCESS FOR THE PRODUCTION OF NICKEL SALTS OF MONOESTERS OF 3,5-DI-TERT. BUTYL-4-HYDROXYBENZYLPHOSPHONIC ACID

DESCRIPTION OF THE INVENTION

The invention relates to a process for the production of nickel salts of monoesters of 3,5-di-tert.butyl-4-hydroxybenzylphosphonic acid from corresponding diesters.

Processes are already known for the production of such nickel salts whereby diesters are first saponified in an aqueous medium, the formed monosodium salt or monopotassium salt of the monoester isolated and reacted with nickel salts in a non-aqueous medium. These processes require a series of operations for the separation and drying of the intermediate product, and are therefore time-consuming.

It has now been found that nickel salts of monoesters of 3,5-di-tert.butyl-4-hydroxybenzylphosphonic acid of formula I:

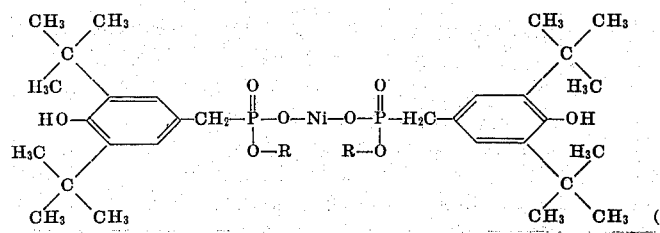

wherein
R represents the methyl group or ethyl group, are obtained, in a single operation, by saponifying diesters of formula II:

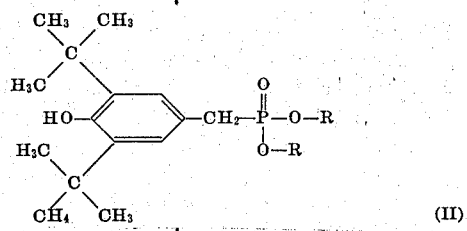

in an aqueous medium with sodium or potassium hydroxide solution to give the monosodium salt or the monopotassium salt of the corresponding monoester; neutralizing or slightly acidifying, after saponification, the reaction mixture; and thereupon adding an aqueous solution of a nickel salt. The nickel salt of the monoester then precipitates almost quantitatively in crystalline form. Surprisingly therefore, the reaction with nickel salts in the aqueous medium which is obtained after saponification and which has a high content of impurities is fully practicable.

Saponification of the diester may be performed with an equivalent amount of caustic solution, i.e. one mole of diester with one mole of sodium hydroxide or potassium hydroxide, when the temperature, at which saponification is carried out, is sufficiently high. Advantageously however, an excess of caustic solution is used, e.g. 20 percent, whereby a temperature of between 120° and 140°, preferably between 125° and 130° C, is maintained in a pressure vessel for 4–6 hours, corresponding to an excess pressure of 1.8 to 2.0 atm.. Saponification can, if need be, be performed also without excess pressure at lower temperatures; the duration of the reaction is then, however, appreciably lengthened. In order to reduce this, it is possible to add to the reaction mixture polyvalent alcohols, e.g. ethylene glycol. or monovalent alcohols such as n-butanol, ethylene glycol monomethyl ether, or eythlene glycol monoethyl ether, as a result of which the temperature of the mixture can be raised, without overpressure, to 100°–120°C.

A mineral acid, such as hydrochloric acid, is advantageously used for neutralizing or slightly acidifying the reaction mixture after saponification. Suitable as an aqueous nickel salt solution are solutions of nickel chloride, nickel nitrate, nickel sulphate and nickel acetate.

The diesters can be produced in a known manner, e.g. by reaction of 3,5-di-tert.butyl-4-hydroxybenzyl chloride or -bromide with trimethyl- or triethylphosphite, as described in the U.S. Pat. No. 3,006,945.

The compounds produced according to the invention are valuable stabilizers, and they serve as agents protecting against light rays for synthetic polymers, especially for polyolefins; they are also able to improve the dyeing properties of synthetic polymers.

The temperatures are given in degrees Centigrade in the following examples.

EXAMPLE 1

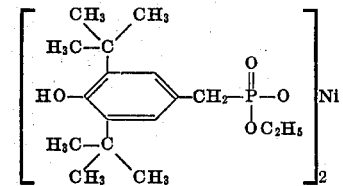

An amount of 356 g (one mole) of 3,5-di-tert.butyl-4-hydroxybenzylphosphonic acid diethyl ester are suspended, in a pressure vessel, in a mixture of 160 g of 30 percent sodium hydroxide solution (1.2 moles) and 400 ml of water. The mixture is then heated under nitrogen until an excess pressure of 1.8 to 2.0 atm. is attained, corresponding to a temperature of 125°–130°. This pressure is maintained for 5 hours by heat being supplied. The mixture is afterwards cooled and diluted with 600 ml of water, whereupon the pH-value of the reaction mixture is reduced with ca. 24 g of 30 percent hydrochloric acid to pH 6.0, and the solution cleared by filtration. A solution of 119 g (0.5 moles) of nickel chloride hexahydrate in 60 ml of water is added dropwise in the course of 1 hour to the filtrate, cooled to 35°–40 and containing the sodium salt of 3,5-di-tert.butyl-4 -hydroxybenzylphosphonic acid monoethyl ester; and the thereby formed crystalline suspension is subsequently stirred for half an hour at the same temperature. The mother liquor is then separated by centrifuging, washed with 250 ml of water, and the blue-green precipitate dried at a pressure of 11 mm at 70°–80 until the weight remains constant. A yellow powder is obtained, the elemental composition of which corresponds to that of a nickel salt (still containing 2–4 percent water) of the above mentioned semiester. The yield is 95 percent of the theoretical value.

EXAMPLE 2

$$\left[ \begin{array}{c} \text{(3,5-di-tert-butyl-4-hydroxybenzyl)} - CH_2 - \underset{\underset{OCH_3}{|}}{\overset{\overset{O}{\|}}{P}} - O \end{array} \right]_2 Ni$$

342 g (1 mole) of 3,5-di-tert.butyl-4-hydroxybenzylphosphonic acid dimethyl ester are suspended, in a pressure vessel, in a mixture of 400 ml of water and 224 g of 30 percent potassium hydroxide solution (1,2 moles). This mixture is heated, under nitrogen, to give an excess pressure of 1.8 to 2.0 atm., corresponding to a temperature of 125°–130°. This pressure is maintained for 5 hours by heat being supplied. The mixture is then cooled, and diluted with 600 ml of water; the pH-value of the reaction mixture is reduced with ca. 24 g of 30 percent hydrochloric acid to pH 6.0; and the solution is then cleared by filtration. Into the filtrate (cooled to 35°–40°) containing the potassium salt of 3,5-di-tert.butyl-4-hydroxybenzylphosphonic acid monomethyl ester is added dropwise, in the course of 1 hour, a solution of 119 g (0.5 mole) of nickel chloride hexahydrate in 60 ml of water; and the thereby formed crystalline suspension is afterwards stirred for half an hour at the same temperature. The mother liquor is now separated by centrifuging; the precipitate is washed with 250 ml of water, and the blue-green product subsequently dried at a pressure of 11 mm Hg at 70°–80° until constant weight is attained. A yellow powder is obtained, the elemental composition of which corresponds to that of a nickel salt (still containing 2–4 percent water) of the above stated semiester. The yield is 95 percent of the theoretical value.

What we claim is:

1. Process for the production of nickel salts of monoesters of 3,5-di-tert.butyl-4-hydroxybenzylphosphonic acid of formula I:

[Structural formula I shown]

wherein
R represent a methyl group or ethyl group, comprising saponifying a diester of the formula II:

[Structural formula II shown]

in an aqueous medium, with sodium or potassium hydroxide solution to give the monosodium salt or monopotassium salt of the corresponding monoester; the reaction mixture is neutralized or slightly acidified after saponification; and to the reaction mixture is then added an aqueous solution of a nickel salt.

2. Process according to claim 1, wherein the saponification is performed at a temperature between 110° and 140° C, preferably between 125° and 130° C.

3. Process according to claim 2, wherein the nickel salt is nickel chloride.

4. Process according to claim 2, wherein the nickel salt is nickel nitrate.

5. Process according to claim 2, wherein the nickel salt is nickel sulphate.

6. Process according to claim 2, wherein the nickel salt is nickel acetate.

* * * * *